Patented Aug. 5, 1952

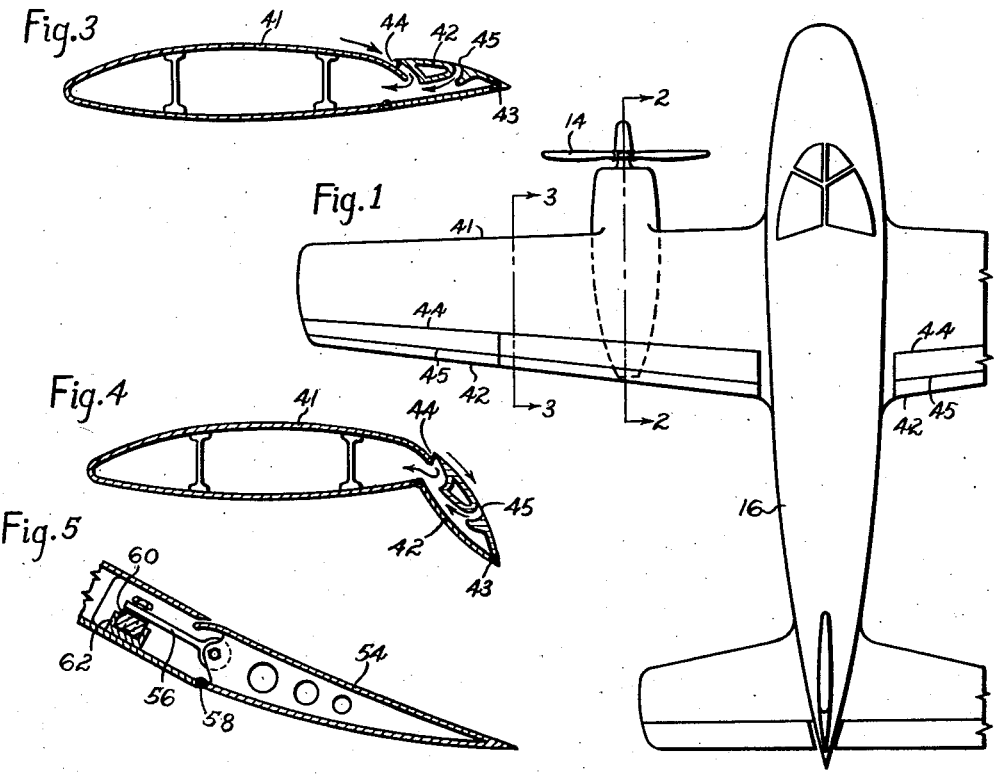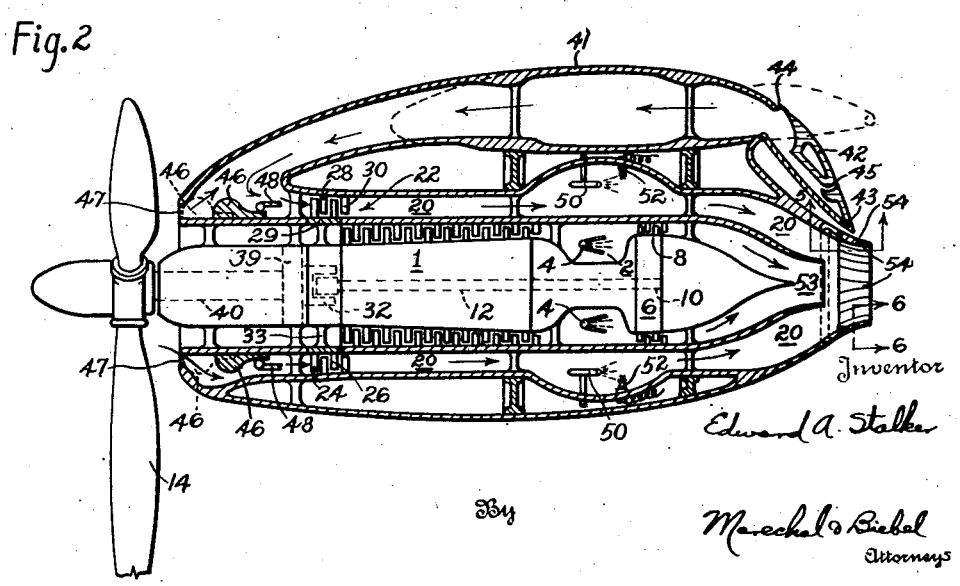

2,605,983

UNITED STATES PATENT OFFICE 2,605,983

GAS TURBINE POWER PLANT AND BOUNDARY LAYER CONTROL SYSTEM FOR AIRCRAFT

Edward A. Stalker, Bay City, Mich.

Application April 6, 1946, Serial No. 660,117

7 Claims. (Cl. 244—40)

This invention relates to aircraft employing boundary layer control.

It is the principal object of the invention to provide a power system for an aircraft which is light in weight, highly efficient in operation, and which develops a high lift accompanied by high thrust making it possible for an aircraft with a heavy pay load to take off with only a limited take-off run.

It is a further object to provide such a power system which is available to develop correspondingly high lift and high thrust during landing.

Other objects will appear from the description, drawings, and claims.

In the drawings:

Fig. 1 is a fragmentary plan view of an aircraft constructed in accordance with the present invention;

Fig. 2 is a fragmentary vertical section along the line 2—2 in Fig. 1;

Fig. 3 is a chordwise section of the wing along line 3—3 in Fig. 1 with the flap raised;

Fig. 4 is the same section as Fig. 3 with the flap down;

Fig. 5 is a section of a portion of the jet control flap along line 5—5 in Fig. 2; and Fig. 6 is a section along line 6—6 in Fig. 2.

Referring to the drawing which illustrates a preferred embodiment of the invention, the power plant is composed of the axial-flow compressor 1 inducting and compressing air which is delivered to the combustion chamber 2. Fuel is introduced by the burner 4 and the products of combustion enter the turbine 6 turning the rotor 8. The turbine shaft 10 is connected to the compressor shaft 12 to rotate it. A propeller 14 is driven by the compressor shaft and constitutes the chief thrust producer for propelling the aircraft 16.

An annular duct 20 surrounds the compressor and turbine and at its forward end is the two-stage auxiliary blower 22 composed of the rotor blades 24 and 26, and the stator blades 28 and 30. These blades are carried on the drum 29 fixed to the hub 31 by the streamline spokes 33.

An automatically disengageable clutch 32 is interposed between the compressor shaft 12 and the auxiliary blower and operably connects it to the compressor shaft. The propeller 14 is connected to the shaft 40 which in turn is connected, by means of the gear box 39, to the clutch 32 and drum 29, thus providing for operation of the propeller at reduced speed relative to shaft 40.

When the turbine is not producing power the turbine and compressor rotors are automatically disengaged from the blower 22 and the propeller 14 so that the latter acting as a windmill can drive the auxiliary blower 22.

The wing is comprised of the main body 41 and the flap 42 which may be lowered to the high lift position shown in Fig. 4. The upper and lower surfaces of the flap are hinged at 43 to accommodate the sliding of the upper surface on the forebody.

The inlet of the auxiliary blower 22 is in communication with the interior of the wing to induct the boundary layer through the induction slots 44 and 45 in the upper surface. This leads to very large lift coefficients of the order of 5 to 6. In the event of power failure the propeller acts as a windmill to drive the auxiliary blower so that power is still available to generate the lift.

Boundary layer control is highly satisfactory for providing high lift coefficients of the order of 5.0 for landing an airplane. It would, however, be desirable to take airplanes off the ground with the same high lift coefficients since it would greatly shorten the run, or greater loads could be flown for the same take-off distance. However, with a lift coefficient of 5.0 the induced drag is so large that flight is not feasible if the payload capacity of the airplane is to be retained undiminished. That is, the horsepower could be increased at the expense of the payload but then the airplane would lose its usefulness. The additional weight of the larger engine would consume too much of the payload and in normal flight the engine would have to be operated at an uneconomical rate of power production.

The need for a large thrust at the time of take-off is met in accordance with this invention by providing a light weight auxiliary blower 22 which discharges a large mass of air rearward through the duct 20. Fuel is injected into the stream of compressed air delivered by the blower 22 through the nozzle 50 and a spark means 52 is provided to ignite the fuel. The burning of fuel heats and greatly expands the flow in duct 20 so that the jet from the exit of the duct has a high velocity. In other words the heat magnifies the thrust of the jet.

At the nose of the nacelle there is adjustably positioned the ring 46 which normally occupies the dotted position shown in Fig. 2. It can be slid rearward to admit air through the annular opening 47. The ring is slid by a plurality of push rods 48. By this means the amount of air available for the auxiliary jet is greatly increased. This is important in order to make a significant contribution to the thrust of the propeller which is a device capable of producing a great thrust at low speed such as the take-off speed. There is thus provided a very powerful axiliary motor with very little additional weight since the blower 22 is useful in flight to decrease the wing drag and to increase the thrust economically and is necessary to make slow landings available for a reduced wing area which increases the effectiveness of horizontal flight.

The turbine 6 discharges its gas (products of combustion) through the nozzle 53.

The duct 20 surrounds the nozzle 53 and has a variable area exit so that the exit area can be enlarged to accommodate the greater specific volume of the heated gas in duct 20 resulting from the combustion of fuel.

The exit is formed by a plurality of flaps 54 hinged to the main body of the nacelle as shown in Figs. 2, 5 and 6. Each flap has a laterally extending tongue 55 which fits loosely into a groove 57 of the adjacent flap so that the exit walls remain substantially sealed.

The flaps are actuated by means of the links 56 articulated to the flap at a point offset from the flap hinge 58. The forward ends of the links are articulated to the ring 60, slidable in the channel 62. The pilot slides the ring peripherally and it pulls or pushes on the flaps through the links 56.

To recapitulate this invention provides an airplane having means of boundary layer control to increase the lift coefficient to very large values and a main power plant for propelling the airplane. The airplane is arranged to be flown off the ground, or made to climb, with the large lift coefficient realized from boundary layer control. To do this, more thrust is required than can be furnished by the propellers and their engines. To provide the thrust without handicapping the aircraft in horizontal flight with additional engine weight, fuel is burned in the inducted and compressed boundary layer air to provide a thrust producing jet. Provision is also made for utilizing in the auxiliary jet not only the boundary layer air but also air inducted through an auxiliary opening in the aircraft to provide greater power and to assure that the auxiliary jet will have a thrust of substantial value relative to the propeller thrust.

When the airplane has achieved sufficient altitude the burning of fuel in the auxiliary jet is discontinued and the auxiliary opening is closed. The auxiliary blower thus inducts air only through the boundary layer control slot or slots while the airplane is flying horizontally, or gliding to a landing.

When the airplane lands with main engine stopped the propeller, acting as a windmill, drives the auxiliary blower to control the wing boundary layer and produce the large lift coefficient necessary for a slow landing speed. During this flight condition the auxiliary opening 47 is closed.

Cross reference is made to copending applications Serial No. 551,373, filed August 26, 1944, now abandoned, and Serial No. 582,394, filed March 12, 1945, now Patent No. 2,449,022, which include subject matter similar to that contained herein.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination, in an aircraft, a wing having surface openings therein for boundary layer induction, a blower having its inlet in communication with said surface openings to induct the boundary layer therethrough with the development of high lift and high induced drag, a duct to conduct the flow from said openings to and beyond said blower, a prime mover operably connected to said blower for operation thereof, said prime mover having an air inlet, a propeller operably connected to said prime mover to propel the aircraft, means to burn fuel in said duct on the downstream side of said blower to produce a jet to augment the thrust of said propeller, and an additional inlet for said duct located within the spanwise extent of said wing surface openings for inducting additional air including non-boundary layer air simultaneously with the induction of said boundary layer air to increase the power of said jet.

2. In combination, in an aircraft, a wing having an induction slot, a blower having its inlet duct normally in closed communication with said wing slot to induct the boundary layer therethrough, a prime mover drivingly connected to said blower, propulsive means operable by said prime mover forming the main power source to propel the aircraft, a duct to conduct the flow through said blower downstream thereof, means directly subject to the relative wind to admit non-boundary layer air into said duct from another opening besides said slot located forwardly of and outside of the contour of said wing to increase the quantity of air therein, means downstream from said blower to heat said air, nozzle means to emit said heated air rearward as a propulsive jet to augment the thrust of said propulsive means, and means to control the quantity of air moving through said slot and said opening differentially.

3. In combination in an aircraft having a wing, means defining a slot in said wing, a prime mover, a propeller operably connected to said prime mover to be rotated thereby to propel the aircraft, said prime mover including an air compressor having an inlet communicating with the atmosphere, a gas turbine receiving compressed air from said compressor, means to burn fuel in said compressed air to form a heated gas entering said turbine for the production of turbine power, and means to apply said power to the compressor to operate it, an auxiliary blower having its inlet duct in communication with said wing slot to induct the boundary layer therethrough, said inlet duct of said auxiliary blower having a closable opening positioned between said slot and the inlet of said auxiliary blower to provide for the induction of air in addition to the air from said slot, means to drive said auxiliary blower from said turbine, means to burn fuel in said inducted air downstream from said blower, and nozzle means to discharge the products of combustion rearward as a jet to provide an auxiliary thrust augmenting the thrust of said propeller.

4. In combination in an aircraft, a wing having induction openings therein for the induction into the wing of boundary layer air, a blower located intermediate the ends of said wing in closed communication with said induction openings through the wing interior, means to drive said blower to induct boundary layer air into the wing through said induction openings, a duct leading downstream from said blower to discharge said inducted air rearward as a propulsive jet, controllable means located within the spanwise extent of said induction openings to admit additional air into said duct including substantial quantities of non-boundary layer air, said duct having a portion thereof downstream from said blower of enlarged cross sectional area, and means to heat said air in said enlarged portion to produce a propulsive jet dischargeable from said duct.

5. In combination in an aircraft, a wing structure having openings on its surface for inflow of air along the span thereof, a jet propulsion means comprising an air compressor having an inlet in communication with the atmosphere, a gas turbine receiving compressed air from said compressor, means to heat said air enroute to said turbine for the production of power, means to apply the power from said turbine to said compressor for operation thereof, an auxiliary blower operated from said turbine having an inlet duct and having its inlet in communication with said surface openings through said duct to induce a flow inward into the wing interior, said inlet duct of said auxiliary blower having a controllable opening within the span of and in addition to said wing structure openings and connected with said inlet of said auxiliary blower to provide for the controlled induction of air in addition to said air from said wing structure openings, and nozzle means to discharge the air from said auxiliary blower rearward as a propulsive jet.

6. In combination in an aircraft, an auxiliary blower, a wing structure having openings on its surface for inflow of air along the span thereof, said wing extending spanwise to both sides of said blower, means of communication between the inlet of said auxiliary blower and said wing interior to induct air through said wing surface openings on opposite sides of said blower for delivery thereto, a propulsion means including an air compressor having an inlet in communication with the atmosphere, a gas turbine receiving compressed air from said compressor, means to heat said air enroute to said turbine for production of power, means to apply said power to said compressor and said blower for operation thereof, and a duct extending forward from said blower to another inlet on the same wing surface and within the spanwise extent of said wing surface openings facing into the relative wind for the induction of air by said blower in addition to air from said wing interior, valve means to control the flow of air to said auxiliary blower differentially with respect to said duct inlet and said wing interior, and nozzle means to discharge the air from said auxiliary blower rearward as a propulsive jet.

7. In combination in an aircraft, a wing having an induction slot therein for controlling the boundary layer, a prime mover comprising an axial flow compressor, a main air inlet for said compressor, a turbine connected to receive compressed air from said compressor, means to heat said compressed air enroute to said turbine, an air duct communicating with said induction slot, blower blades within said duct mounted for rotation to impel a flow of air therethrough, means operated by said turbine to rotate said blades, means located within the spanwise extent of said induction slot forming an additional air inlet opening into said duct for supplying additional air including non-boundary layer air thereto, and means for controlling said additional opening to regulate the quantity of air so introduced independently of the air supplied to said main inlet to said compressor.

EDWARD A. STALKER.

REFERENCES CITED

The following references are of record in the file of this patent:

UNITED STATES PATENTS

| Number | Name | Date |
|---|---|---|
| 1,879,717 | Sikorsky | Sept. 27, 1932 |
| 1,986,064 | Leray | Jan. 1, 1935 |
| 2,024,274 | Campini | Dec. 17, 1935 |
| 2,041,795 | Stalker | May 26, 1936 |
| 2,160,281 | Price | May 30, 1939 |
| 2,162,956 | Lysholm | June 20, 1939 |
| 2,340,396 | McDonnell | Feb. 1, 1944 |
| 2,390,161 | Mercier | Dec. 4, 1945 |
| 2,396,911 | Anxionnaz | Mar. 19, 1946 |

FOREIGN PATENTS

| Number | Country | Date |
|---|---|---|
| 479,598 | Great Britain | Feb. 7, 1938 |
| 523,468 | Great Britain | July 15, 1940 |
| 538,022 | Great Britain | July 17, 1941 |

OTHER REFERENCES

Ser. No. 396,458, Richard (A. P. C.), published May 25, 1943.